(12) United States Patent
Chi et al.

(10) Patent No.: US 9,084,226 B2
(45) Date of Patent: Jul. 14, 2015

(54) FEMTO ACCESS POINT AND COMMUNICATION METHOD THEREOF

(75) Inventors: Po-Wen Chi, Taipei (TW); Ching-Lun Lin, Zhongli (TW); Yu-Hsiang Lin, Kuei-Shan Hsiang (TW); Wei-Chih Lin, Keelung (TW); Chih-Hsiang Ho, Taipei (TW); Heng-Iang Hsu, Taipei (TW)

(73) Assignee: Institute For Information Industry, Taipei (TW)

( * ) Notice: Subject to any disclaimer, the term of this patent is extended or adjusted under 35 U.S.C. 154(b) by 1445 days.

(21) Appl. No.: 12/630,831

(22) Filed: Dec. 3, 2009

(65) Prior Publication Data

US 2011/0128944 A1   Jun. 2, 2011

(30) Foreign Application Priority Data

Nov. 27, 2009  (TW) ................................ 98140566 A

(51) Int. Cl.
| | |
|---|---|
| H04W 4/00 | (2009.01) |
| H04W 76/02 | (2009.01) |
| H04W 84/04 | (2009.01) |

(52) U.S. Cl.
CPC ............ *H04W 76/02* (2013.01); *H04W 84/045* (2013.01)

(58) Field of Classification Search
USPC ......................................................... 370/338
See application file for complete search history.

(56) References Cited

U.S. PATENT DOCUMENTS

| | | | |
|---|---|---|---|
| 2007/0177530 A1* | 8/2007 | Ando et al. ................... | 370/277 |
| 2008/0137646 A1 | 6/2008 | Agarwal et al. | |
| 2009/0113073 A1* | 4/2009 | Koide et al. ................... | 709/245 |
| 2009/0119741 A1* | 5/2009 | Palnitkar et al. .................. | 726/1 |

FOREIGN PATENT DOCUMENTS

TW    I358918    7/2009

OTHER PUBLICATIONS

NPL document IEEE Std 802.16™—2009, Part 16: Air Interface for Broadband Wireless Access Systems, dated May 29, 2009.*
Office Action by Taiwan Intellectual Property Office for foreign counterpart application TW 098140566 to the present US application, Oct. 30, 2012, 5 pages.

* cited by examiner

*Primary Examiner* — Gregory Sefcheck
*Assistant Examiner* — Majid Esmaeilian
(74) *Attorney, Agent, or Firm* — Skaar Ulbrich Macari, P.A.

(57) ABSTRACT

A femto access point (FAP) for use in a network system and a communication method for the femto access point are provided. A mobile station is wirelessly connected to the FAP. The FAP comprises a storage unit, a sniffer unit, and a process unit. The sniffer unit sniffs a packet of the mobile station. The process unit retrieves an identity (ID) code of the mobile station from the packet and stores the ID code into the storage unit. The process unit further establishes an uplink local area network (LAN) service flow and a downlink LAN service flow of the mobile station. The uplink LAN service flow and the downlink LAN service flow established by the FAP and the mobile station are used to transfer packets within the LAN.

20 Claims, 7 Drawing Sheets

FEMTO ACCESS POINT AND COMMUNICATION METHOD THEREOF

PRIORITY

This application claims priority to Taiwan Patent Application No. 098140566 filed on Nov. 27, 2009, the disclosure of which is incorporated by reference herein in its entirety.

FIELD

The present invention relates to a femto access point (FAP) and a communication method thereof; more particularly, the FAP and the communication method thereof according to the present invention improve transmission performances of mobile stations (MSs) in a local area network (LAN) and reduce traffic flows in a wide area network (WAN) by establishing dedicated LAN service flows for the MSs of the LAN.

BACKGROUND

Conventionally, problems of poor signal reception, a too-slow transmission rate and the like are often encountered when a wireless mobile communication network is used indoors. Although a variety of communication devices using different network interfaces (e.g., Wireless Fidelity (Wi-Fi)) and High Speed Packet Access (HSPA)) have been provided in the market to solve these problems, these communication devices increase the cost for the users.

The Femto Forum established in 2007 has proposed a Femto Access Point (FAP) to solve various problems of indoor wireless mobile communication networks completely. An FAP is an access point (AP) of a low power level that uses a licensed wireless frequency band at a front end thereof, so no changes need to be made on the user's equipment. For the operators, a larger wireless network coverage rate may be achieved in an indoor environment by use of an FAP. A back end of the FAP is connected to an operator's network through an existing wired network technology (e.g., through a Digital Subscriber Line (DSL) modem or through a cable modem) to facilitate the operator to provide better network management services.

FIG. 1 depicts a conventional network system 1 that adopts an FAP architecture. The network system 1 comprises an FAP 115, a modem 117, a security gateway 121 and a femto gateway 123. The modem 117 may be any modem connectable to a home broadband network 119, for example, a DSL modem or a cable modem. The FAP 115 is connected to the security gateway 121 via the modem 117 and the home broadband network 119. The security gateway 121 is in turn connected to the femto gateway 123 and further to the Internet 125. The home broadband network 119 and the FAP 115 may belong to different operators; in other words, data transmitted by the FAP 115 may be transmitted through other operators' network. In view of this, a secure channel must be established between the FAP 115 and the security gateway 121 to secure data transmission therebetween. The femto gateway 123 is responsible for establishing data flows of a first mobile station 111 and a second mobile station 113 and acts as a gateway between the internal network and an external network.

Both the first mobile station 111 and the second mobile station 113 are connected to the Internet 125 via the femto gateway 123. If the first mobile station 111 intends to transmit data to the second mobile station 113, the data must be transmitted to the femto gateway 123 via the FAP 115, the modem 117, the home broadband network 119 and the security gateway 121 at first and then transmitted to the second mobile station 113 via the security gateway 121, the home broadband network 119, the modem 117 and the FAP 115 from the femto gateway 123.

The transmission method described above has the following three disadvantages: firstly, the data transmission rate is restricted by the home broadband network 119. As currently the home broadband network 119 generally has a bandwidth of around 10 Mbps which is still lower than that can be provided by a wide area network system (e.g., a Worldwide Interoperability for Microwave Access (WiMAX) network system), the bandwidth that may be enjoyed by the user is restricted by the home broadband network 119; secondly, data transmission is accomplished through networks and network equipment provided by a lot of Internet service providers (ISPs), so a considerable latency and signal jitter may be caused; and thirdly, as private data of the user must be exposed to the networks of the ISPs, there is a significantly higher possibility of data breach.

Accordingly, for network systems adopting the FAP architecture, there remains a need in the art to provide a solution that can enlarge the bandwidth available for use by mobile stations and enhance the security of data transmission when the mobile stations served by the network systems intend to transmit data within a local area network (LAN).

SUMMARY

An objective of certain embodiments of the present invention is to provide a femto access point (FAP) for use in a network system. A first mobile station is wirelessly connected to the FAP. The FAP comprises a storage unit, a sniffer unit and a process unit. The sniffer unit is configured to sniff a first packet of the first mobile station. The process unit is configured to retrieve a first identity (ID) code of the first mobile station from the first packet, store the first ID code into the storage unit, and establish a first uplink local area network (LAN) service flow and a first downlink LAN service flow of the first mobile station according to the first ID code.

If a second mobile station is also connected to the FAP, the FAP will establish a second uplink LAN service flow and a second downlink LAN service flow of the second mobile station in a similar way. Then, when the first mobile station desires to transmit a third packet to the second mobile station, the first mobile station will transmit the third packet via the first uplink LAN service flow to the FAP which, in turn, transmits the third packet to the second mobile station via the second downlink LAN service flow. Similarly, when the second mobile station desires to transmit a fourth packet to the first mobile station, the second mobile station will transmit the fourth packet via the second uplink LAN service flow to the FAP which, in turn, transmits the fourth packet to the first mobile station via the first downlink LAN service flow.

Another objective of certain embodiments of the present invention is to provide a communication method of an FAP for use in a network system. A first mobile station is wirelessly connected to the FAP. The communication method comprises the following steps of: (a) enabling the FAP to sniff a first packet of the first mobile station; (b) enabling the FAP to retrieve a first ID code of the first mobile station from the first packet; (c) enabling the FAP to store the first ID code; and (d) enabling the FAP to establish a first uplink LAN service flow and a first downlink LAN service flow of the first mobile station according to the first ID code.

If a second mobile station is also connected to the FAP, the communication method will establish a second uplink LAN service flow and a second downlink LAN service flow of the second mobile station in a similar way. Afterwards, when the first mobile station intends to transmit a third packet to the second mobile station, the first mobile station will transmit the third packet via the first uplink LAN service flow to the FAP and the FAP then transmits the third packet to the second mobile station via the second downlink LAN service flow. Similarly, when the second mobile station intends to transmit a fourth packet to the first mobile station, the second mobile station will transmit the fourth packet via the second uplink LAN service flow to the FAP and the FAP then transmits the fourth packet to the first mobile station via the first downlink LAN service flow.

Accordingly, in addition to establishing WAN service flows for mobile stations within the LAN coverage thereof, the FAP and the communication method of certain embodiments of the present invention further establish LAN service flows for the mobile stations (i.e., the first uplink LAN service flow, the first downlink LAN service flow, the second uplink LAN service flow, and the second downlink LAN service flow described above). Thereby, when a mobile station intends to transmit data to other mobile stations located within the same LAN, the LAN service flows will be used by the FAP and the mobile station. On the other hand, when a mobile station intends to transmit data to other devices outside the LAN, the WAN service flows will be used by the FAP and the mobile station. By separating WAN service flows from LAN service flows, data to be transmitted within the LAN will not be transmitted firstly to the femto gateway and then be transmitted back to the target mobile station. Consequently, data transmissions within the LAN are not restricted by the bandwidth of the WAN and fully enjoy the bandwidth of the LAN. Furthermore, as all data transmissions of the LAN occur within the LAN and occupies no bandwidth of the WAN. Therefore, problems confronted by the conventional FAP are addressed by the FAP and the communication method of the present invention.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

Figure 1:
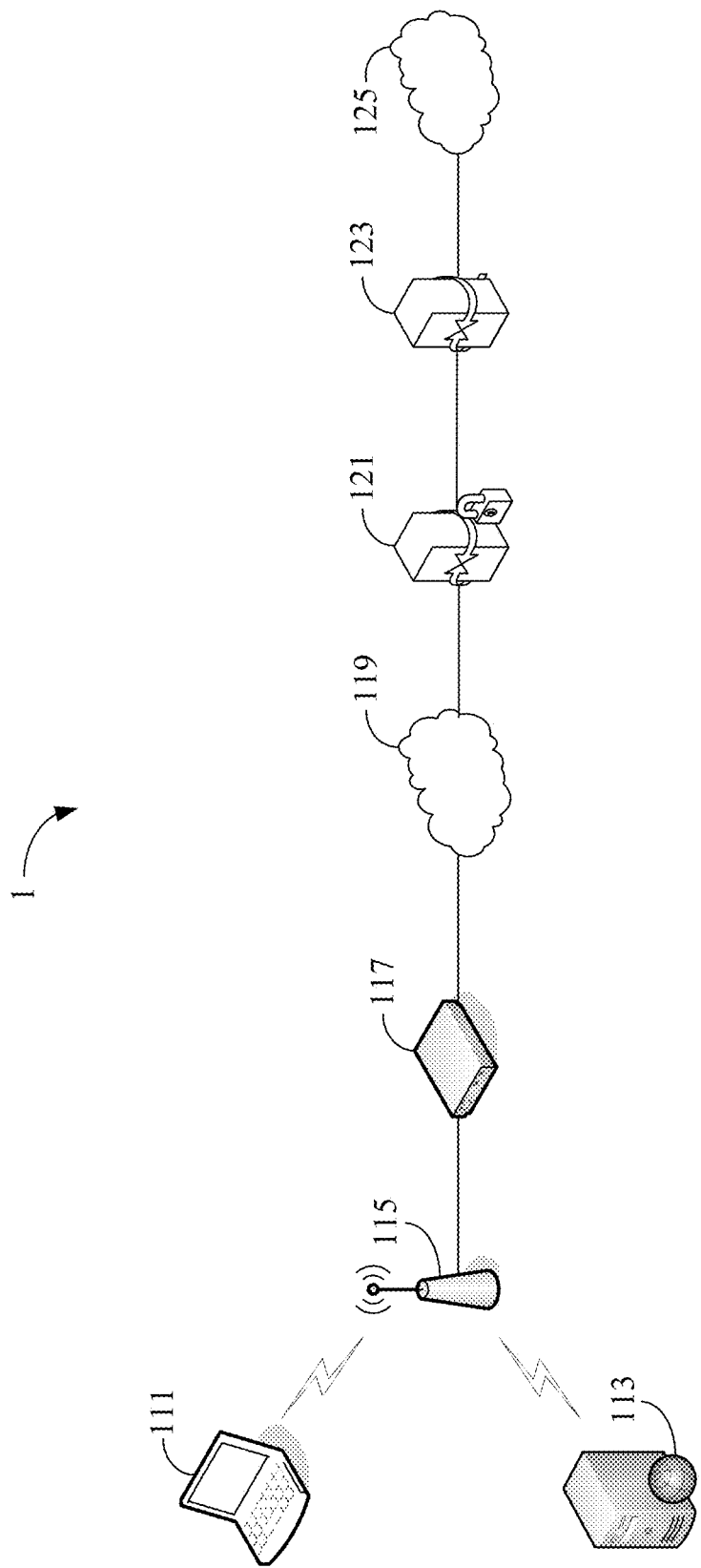
FIG. 1 depicts a conventional wireless network system adopting the FAP technology.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the spirit and scope of the invention as defined by the appended claims.

DETAILED DESCRIPTION

The FAP and the communication method thereof disclosed in the example embodiments present invention establishes LAN service flows for mobile stations it serves. By doing so, if mobile stations served by the FAP (i.e. mobile stations within the same LAN) intend to transmit data therebetween, data transmissions will be accomplished through the LAN service flows. Therefore, when a mobile station intends to transmit data within the LAN, a larger bandwidth can be used and the security of data transmission is improved. Description of the following example embodiments is only for purpose of illustration rather than limitation. It should be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 2A:
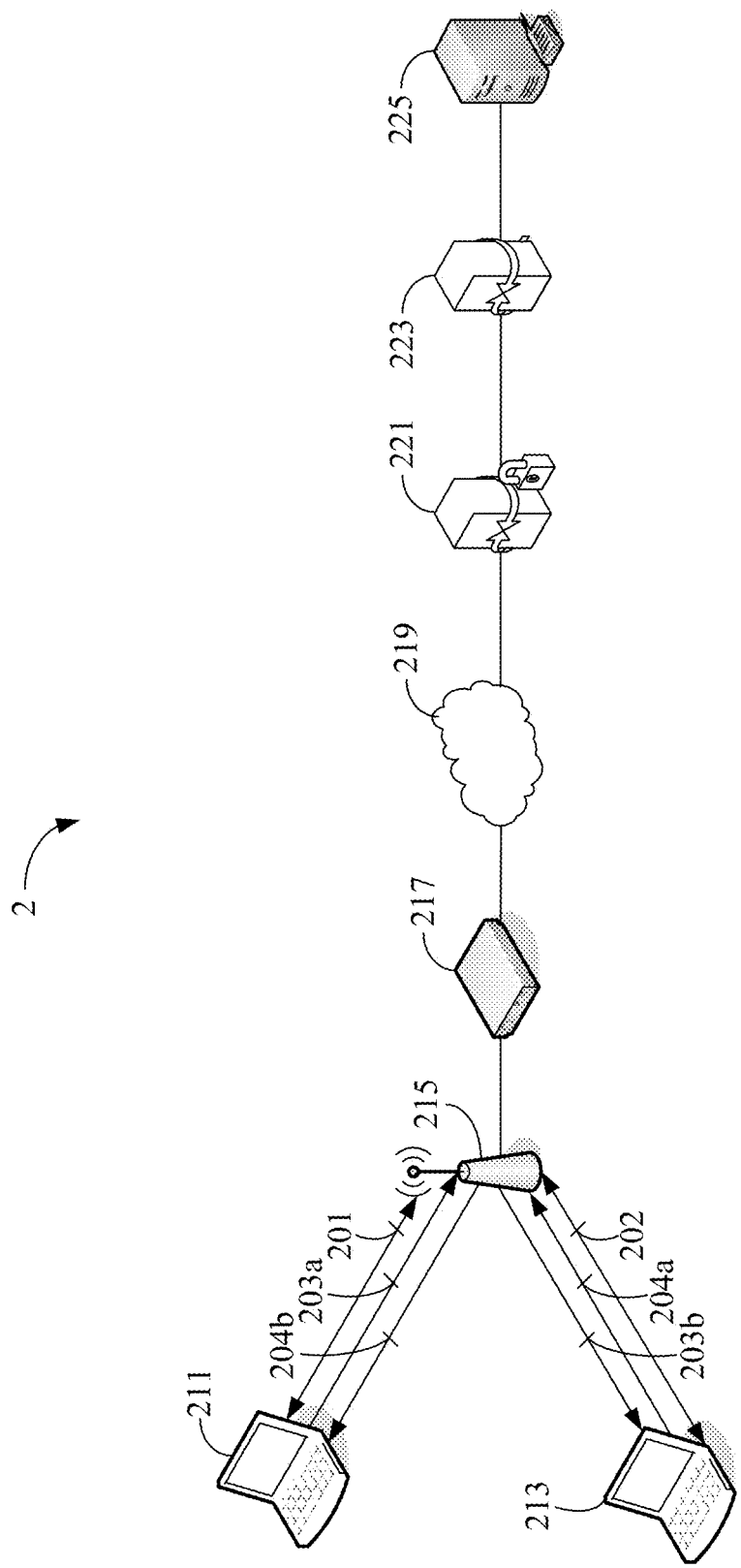
FIG. 2A is a schematic view depicting an architecture of a network system of a first embodiment.

A first example embodiment of the present invention is a network system 2, a schematic view of which is shown in FIG. 2A. The network system 2 comprises an FAP 215, a modem 217, a security gateway 221, a femto gateway 223, and a Dynamic Host Configuration Protocol (DHCP) server 225. The modem 217 may be any modem connectable to a home broadband network 219, e.g., a DSL modem or a cable modem. The FAP 215 is connected to the security gateway 221 via the modem 217 and the home broadband network 219. The security gateway 221 is in turn connected to the femto gateway 223 and further to the Internet and the DHCP server 225 thereof. Via the architecture of the network system 2, any mobile station (e.g., the first mobile station 211 and the second mobile station 213) may acquire wide area network (WAN) services after being connected to the FAP 215. It is understood that the FAP 215 of the present invention has the same functionality as those of the conventional FAP 115, so the portions that are identical to the conventional technology will not be further described herein. Hereinbelow, additional operations and functions provided uniquely by the FAP 215 of the present invention in the network system 2 will be detailed.

Figure 2B:
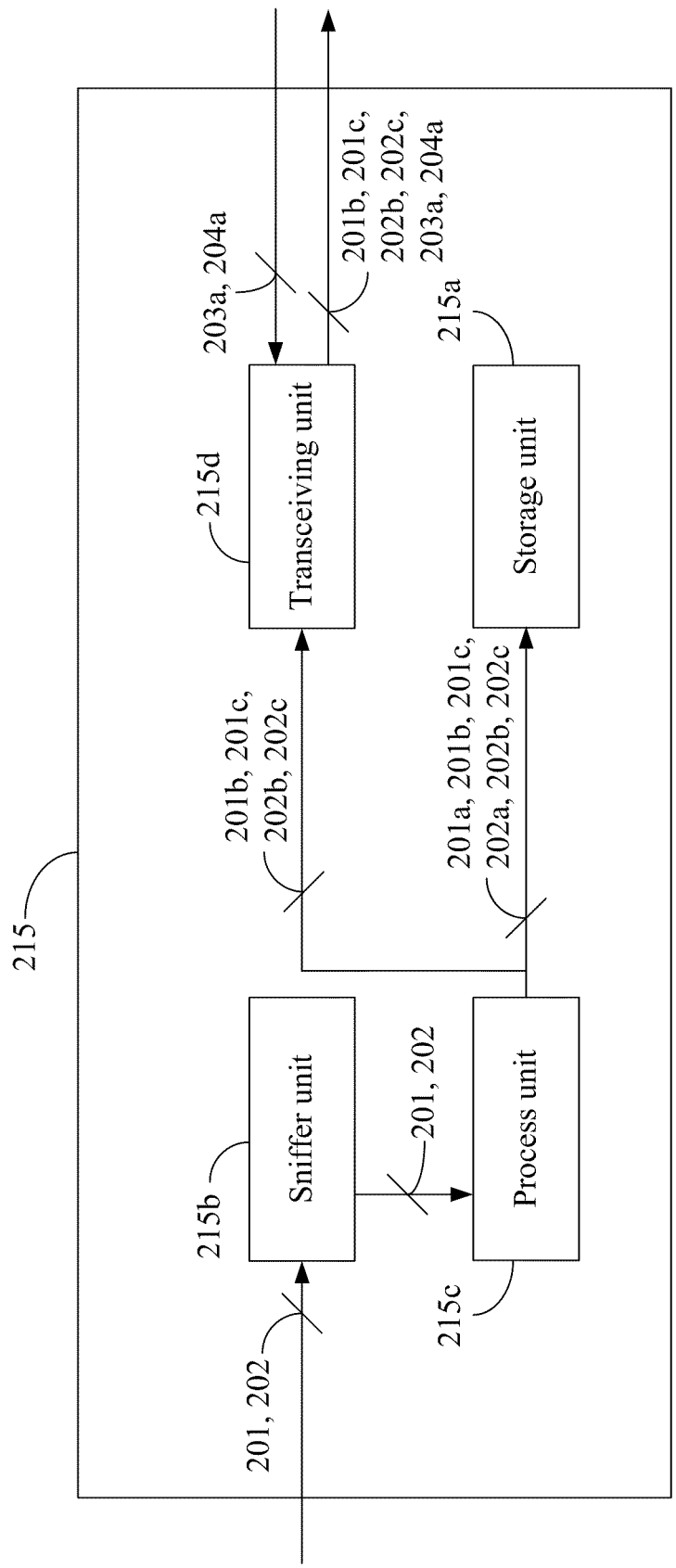
FIG. 2B is a schematic view depicting an FAP of the first embodiment.

Please refer to FIG. 2B as well, which illustrates a schematic view of the FAP 215. The FAP 215 comprises a storage unit 215$a$, a sniffer unit 215$b$, a process unit 215$c$, and a transceiving unit 215$d$. The first mobile station 211 is wirelessly connected to the FAP 215 to acquire WAN services via the FAP 215. The sniffer unit 215$b$ sniffs a first packet 201 of the first mobile station 211. The first packet 201 is a packet transmitted or received by the first mobile station 211. After the first packet 201 is sniffed by the sniffer unit 215$b$, the process unit 215$c$ retrieves a first ID code 201$a$ of the first mobile station 211 from the first packet 201 and stores the first ID code 201$a$ into the storage unit 215$a$. It shall be appreciated that, the first ID code 201$a$ of the first mobile station 211 is an ID code adapted to distinguish the first mobile station 211 from other mobile stations. For example, the first ID code 201$a$ may be an IP address or a MAC address of the first mobile station 211. By storing the first ID code 201$a$, the FAP 215 learns that the first mobile station 211 is located within the LAN coverage it defines.

The process unit 215$c$ establishes a first uplink LAN service flow and a first downlink LAN service flow of the first mobile station 211 according to the first ID code 201$a$. The process unit 215c further stores setting information 201b of the first uplink LAN service flow and setting information 201c of the first downlink LAN service flow into the storage unit 215a. Additionally, the transceiving unit 215d transmits the setting information 201b of the first uplink LAN service flow and setting information 201c of the first downlink LAN service flow to the first mobile station 211. Thus, the first mobile station 211 learns which mobile stations are located within the LAN coverage defined by the FAP 215 and also learns the setting information 201b of the first uplink LAN service flow and setting information 201c of the first downlink LAN service flow that it uses. Thereafter, when the first mobile station 211 intends to transmit data to other mobile stations located within the LAN coverage of the FAP 215, the first mobile station 211 transmits the data via the first uplink LAN service flow. Besides, when the FAP 215 intends to transmit data within the LAN coverage thereof to the first mobile station 211, the data will be transmitted via the first downlink LAN service flow.

After the first mobile station 211 is wirelessly connected to the FAP 215, the second mobile station 213 is also wirelessly connected to the FAP 215 to acquire the WAN services via the FAP 215. Likewise, the sniffer unit 215b sniffs a second packet 202 of the second mobile station 213. The second packet 202 is a packet transmitted or received by the second mobile station 213. After the second packet 202 is sniffed by the sniffer unit 215b, the process unit 215c retrieves a second ID code 202a of the second mobile station 213 from the second packet 202 and stores the second ID code 202a into the storage unit 215a. The second ID code 202a of the second mobile station 213 is also an ID code adapted to distinguish the second mobile station 213 from other mobile stations. For example, the second ID code 202a may be an IP address or a MAC address of the second mobile station 213. By storing the second ID code 202a, the FAP 215 learns that the second mobile station 213 is located within the LAN coverage it defines.

The process unit 215c establishes a second uplink LAN service flow and a second downlink LAN service flow of the second mobile station 213. The process unit 215c further stores setting information 202b of the second uplink LAN service flow and setting information 202c of the second downlink LAN service flow into the storage unit 215a. Similarly, the transceiving unit 215d transmits the setting information 202b of the second uplink LAN service flow and setting information 202c of the second downlink LAN service flow to the second mobile station 213. Thus, the second mobile station 213 learns which mobile stations are located within the LAN coverage defined by the FAP 215 and also learns the setting information 202b of the second uplink LAN service flow and setting information 202c of the second downlink LAN service flow that it uses. Thereafter, when the second mobile station 213 intends to transmit data to other mobile stations located within the LAN coverage of the FAP 215, the second mobile station 213 transmits the data via the second uplink LAN service flow. Moreover, when the FAP 215 intends to transmit data within the LAN coverage thereof to the second mobile station 213, the data will be transmitted via the second downlink LAN service flow.

Besides, the process unit 215c also changes the first uplink LAN service flow according to the second ID code 202a, and stores the setting information 201c of the changed first uplink LAN service flow into the storage unit 215a. Then, the setting information 201c of the changed first uplink LAN service flow is transmitted by the transceiving unit 215d to the first mobile station 211. Thus, the first mobile station 211 learns that the second mobile station 213 has joined in the LAN coverage defined by the FAP 215.

After the first uplink LAN service flow, the first downlink LAN service flow, the second uplink LAN service flow and the second downlink LAN service flow have been established, data transmission in the LAN defined by the FAP 215 are described. The first case is that the second mobile station 213 intends to transmit a third packet to the first mobile station 211. Because the second mobile station 213 has learned that the first mobile station 211 is located within the LAN coverage of the FAP 215, it transmits the third packet 203a via the second uplink LAN service flow. Then the transceiving unit 215d of the FAP 215 receives the third packet 203a transmitted by the second mobile station 213 via the second uplink LAN service flow. As the third packet 203a is transmitted via the second uplink LAN service flow, the FAP 215 learns that the third packet 203a is a packet that belongs to the LAN coverage thereof. The process unit 215c further determines that the third packet 203a carriers the first ID code 201a and learns that the destination of the third packet 203a is the first mobile station 211. Then, the transceiving unit 215d transmits the third packet 203b to the first mobile station 211 via the first downlink LAN service flow.

A second case is that the first mobile station 211 intends to transmit a fourth packet to the second mobile station 213. Because the setting information 201c of the changed first uplink LAN service flow has been received by the first mobile station 211 from the FAP 215, the first mobile station 211 learns that the second mobile station 213 has joined in the LAN coverage defined by the FAP 215. Therefore, the first mobile station 211 transmits the fourth packet 204a via the first uplink LAN service flow. Then the transceiving unit 215d of the FAP 215 receives the fourth packet 204a transmitted by the first mobile station 211 via the first uplink LAN service flow. As the fourth packet 204a is transmitted via the first uplink LAN service flow, the FAP 215 learns that the fourth packet 204a is a packet that belongs to the LAN coverage thereof. The process unit 215c further determines that the fourth packet 204a carriers the second ID code 202a and, from this, learns that the destination of the fourth packet 204a is the second mobile station 213. Then, the transceiving unit 215d transmits the fourth packet 204b to the second mobile station 213 via the second downlink LAN service flow.

If the process unit 215c finds that the first mobile station 211 is disconnected from the FAP 215, then the process unit 215c deletes the first uplink LAN service flow and the first downlink LAN service flow and updates the second uplink LAN service flow according to the first ID code 201a. The process unit 215c deletes the first ID code 201a, the setting information 201b of the first uplink LAN service flow, and the setting information 201c of the first downlink LAN service flow that are stored in the storage unit 215a. The process unit 215c also stores the setting information 202b of the updated second uplink LAN service flow. Then, the setting information 202b of the updated second uplink LAN service flow is transmitted by the transceiving unit 215d to the second mobile station 213 so that the second mobile station 213 learns that the first mobile station 211 has moved out of the LAN coverage of the FAP 215.

Figure 2C:
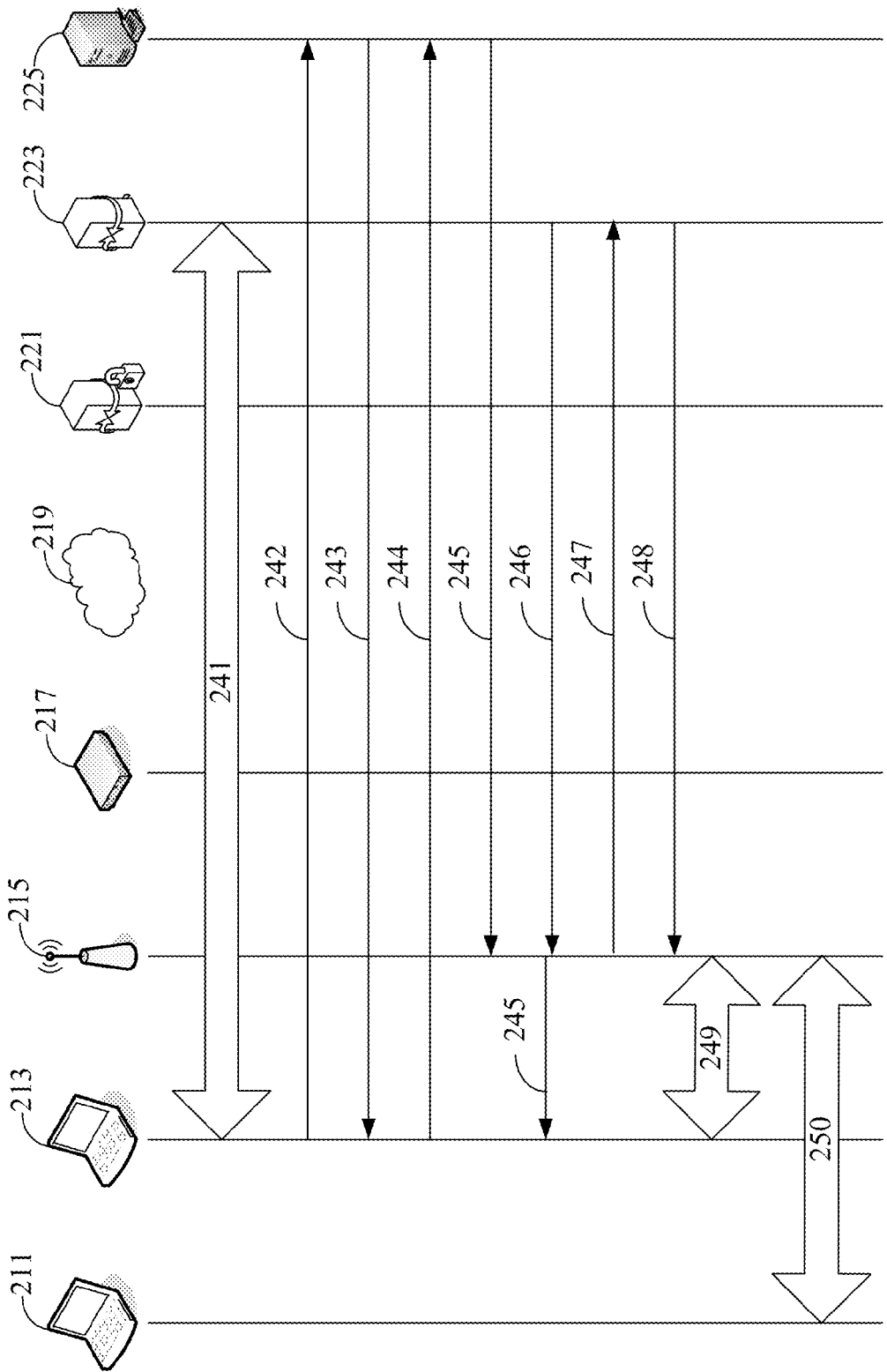
FIG. 2C is a schematic view depicting transmission of some signals in a network system 2 complying with the WiMAX standard.

FIG. 2C illustrates a schematic view of transmission of some example signals in the network system 2, when the network system 2 complies with the Worldwide Interoperability for Microwave Access (WiMAX) standard. In particular, the starting time point corresponding to the data flow depicted in FIG. 2C is a time point that occurs after the first uplink LAN service flow and the first downlink LAN service flow of the first mobile station 211 have been established but before the second mobile station 213 enters into the LAN coverage of the FAP 215.

When the second mobile station 213 intends to be connected to the WiMAX WAN via the FAP 215, an initialization process 241 will be conducted between the second mobile station 213 and the femto gateway 223. In particular, the initialization process 241 is accomplished through RNG, SBC, MS Pre-Attachment (R6-F), EAP, REG, MS Attachment (R6-F), DP Registration (R6-F) and DSA in the WiMAX standard, which are well-known to those familiar with the WiMAX standard and thus will not be further described herein.

Next, in order to acquire the IP address, the second mobile station 213 transmits a DHCP Discover signal 242 to the DHCP server 225. After receiving the DHCP Discover signal 242, the DHCP server 225 transmits a DHCP Offer signal 243 to the second mobile station 213. The second mobile station 213 then transmits a DHCP Request signal 244 to the DHCP server 225 after receiving the DHCP Offer signal 243. Subsequently, the DHCP server 225 transmits a DHCP ACK signal 245 to the second mobile station 213. The DHCP ACK signal 245 carries an IP address assigned by the DHCP server 225 to the second mobile station 213. The DHCP Discover signal 242, the DHCP Offer signal 243, the DHCP Request signal 244, and the DHCP ACK signal 245 transmitted between the second mobile station 213 and the DHCP server 225 are well-known to those of ordinary skill in the art and, thus, will not be further described herein. The aforesaid second packet 202 may be the DHCP ACK signal 245. When the DHCP ACK signal 245 (i.e., the second packet 202) transmitted by the DHCP server 225 passes through the FAP 215, the sniffer unit 215b sniffs the DHCP ACK signal 245 and the process unit 215c retrieves the IP address from the DHCP ACK signal 245 (i.e., the second packet 202) for use as the second ID code 202a of the second mobile station 213.

To establish a WAN service flows of the second mobile stations 213, the femto gateway 223 transmits a WAN service request signal 246 to the FAP 215. The FAP 215 transmits a WAN service response signal 247 back to the femto gateway 223, and then the femto gateway 223 transmits a WAN service ACK signal 248 to the FAP 215. Because FIG. 2C depicts the case when the network system 2 complies with the WiMAX standard, the WAN service request signal 246 is a DP Registration Request (R6-F) signal in the WiMAX standard, the WAN service response signal 247 is a DP Registration Response (R6-F) signal in the WiMAX standard, and the WAN service ACK signal 248 is a DP Registration ACK (R6-F) signal in the WiMAX standard. These signals defined in the WiMAX standard are well-known to those familiar with the WiMAX standard and, thus, will not be further described herein.

Next, how the FAP 215 establishes the second uplink LAN service flow and the second downlink LAN service flow of the second mobile station 213 when the network system 2 complies with the WiMAX standard will be described. In particular, the process unit 215c of the FAP 215 establishes the second uplink LAN service flow and the second downlink LAN service flow through a Dynamic Service Addition (DSA) process 249 defined in the WiMAX standard. Additionally, because the first mobile station 211 is already located within the LAN coverage of the FAP 215, the process unit 215c changes the first uplink LAN service flow of the first mobile station 211 through a Dynamic Service Change (DSC) process 250 defined in the WiMAX standard.

It shall be appreciated that FIG. 2C only depicts signal transmission related to the second mobile station 213 due to restriction of the paper size. In fact, if the first mobile station 211 intends to access the Internet via the FAP 215, operations of the network system 2 will be just the same so the details are not described herein. Additionally, although the network system 2 is illustrated as a WiMAX wireless communication system in FIG. 2C, the network system may be a third generation (3G) mobile communication system or a fourth generation (4G) mobile communication system in other examples.

Figure 3A:
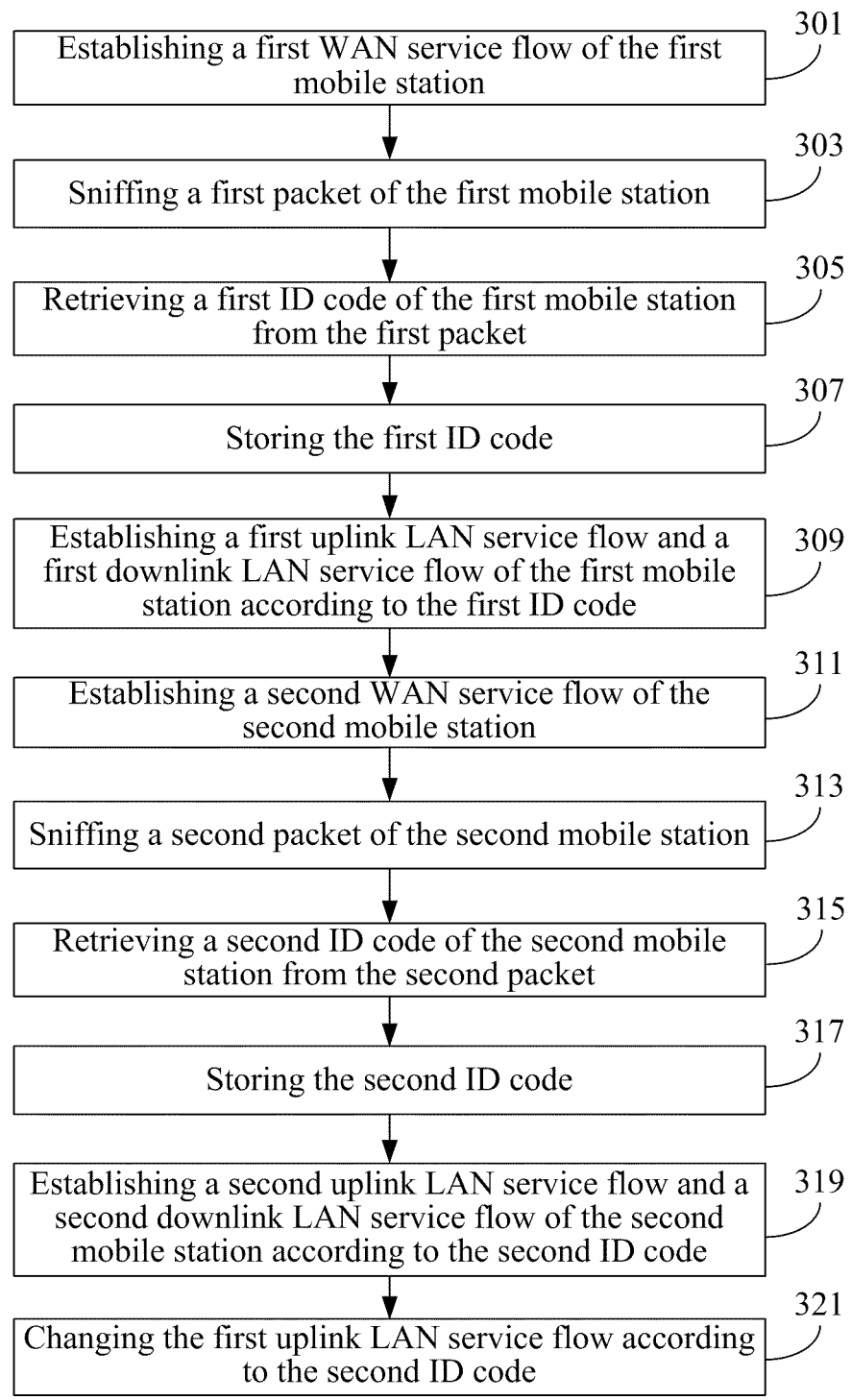
FIG. 3A is a partial flowchart of a communication method of the present invention.
Figure 3B:
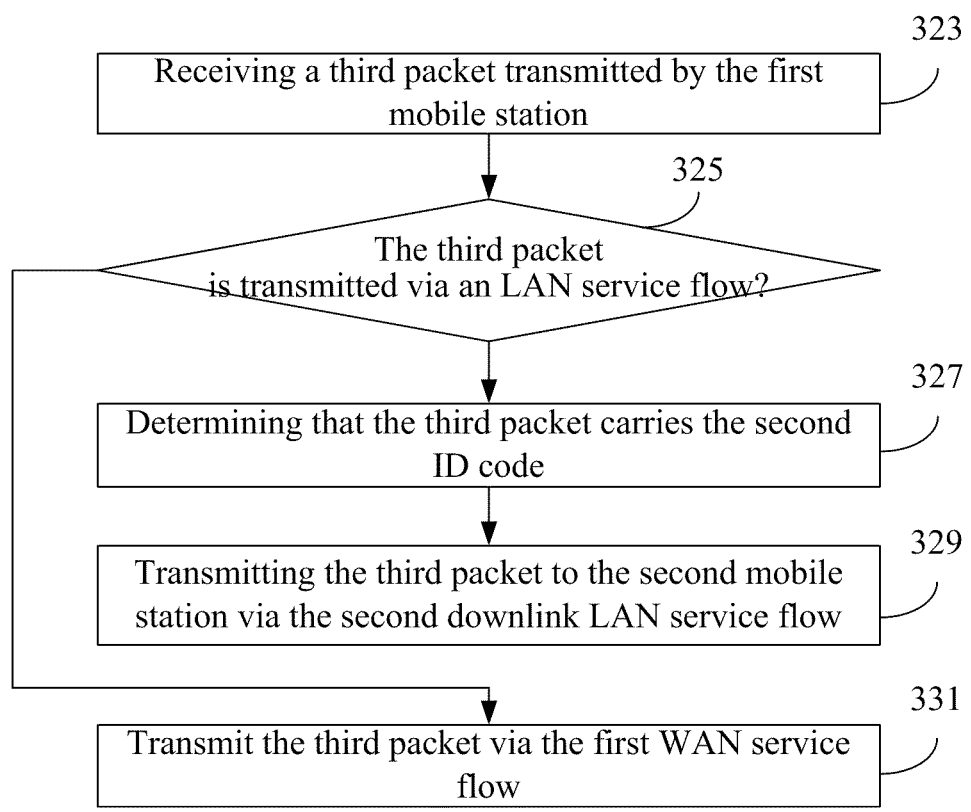
FIG. 3B is another partial flowchart of the communication method of the present invention.
Figure 3C:
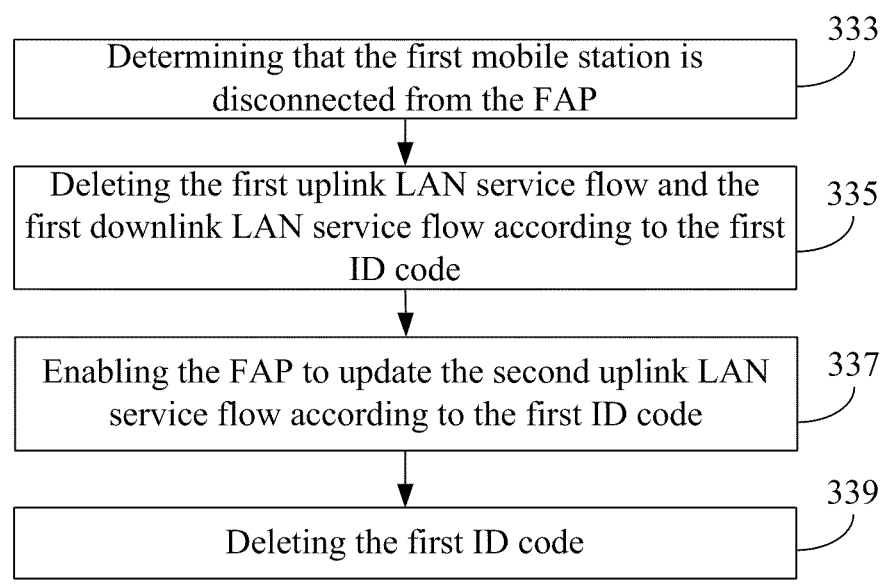
FIG. 3C is yet another partial flowchart of the communication method of the present invention.

FIGS. 3A-3C depict flowcharts of a communication method of an embodiment of the present invention. The communication method of this embodiment is adapted for use in an FAP of a network system, e.g., the network system 2 and the FAP 215 of the first embodiment.

When a first mobile station is wirelessly connected to the FAP, step 301 of the communication method is executed to establish a first WAN service flow of the first mobile station. Then, step 303 is executed to enable the FAP to sniff a first packet of the first mobile station, and step 305 is executed to enable the FAP to retrieve a first ID code of the first mobile station from the first packet. Thereafter, step 307 is executed to enable the FAP to store the first ID code, and step 309 is executed to enable the FAP to establish a first uplink LAN service flow and a first downlink LAN service flow of the first mobile station according to the first ID code.

When a second mobile station is wirelessly connected to the FAP, step 311 of the communication method is executed to establish a second WAN service flow of the second mobile station. Then, step 313 is executed to enable the FAP to sniff a second packet of the second mobile station, and step 315 is executed to enable the FAP to retrieve a second ID code of the second mobile station from the second packet. Thereafter, step 317 is executed to enable the FAP to store the second ID code, and step 319 is executed to enable the FAP to establish a second uplink LAN service flow and a second downlink LAN service flow of the second mobile station according to the second ID code. Further, step 321 is executed to enable the FAP to change the first uplink LAN service flow according to the second ID code.

Afterwards, step 323 is executed to enable the FAP to receive a third packet transmitted by the first mobile station. Next, step 325 is executed to determine whether the third packet is transmitted via a LAN service flow (e.g., the first uplink LAN service flow). If the answer is "No", it means that the third packet is transmitted via the first WAN service flow and then step 331 is executed to enable the FAP to transmit the third packet via the first WAN service flow. Otherwise, if the answer of step 325 is "Yes", then step 327 is executed to enable the FAP to determine that the third packet carries the second ID code. Finally, step 329 is executed to enable the FAP to transmit the third packet to the second mobile station via the second downlink LAN service flow. It shall be appreciated that, if other packets are received from the second mobile station after completion of the steps 301-321, operations similar to those of the steps 325-331 will be performed; this will not be further described herein.

Subsequently, step 333 is executed to enable the FAP to determine that the first mobile station is disconnected from the FAP (for example, the FAP receives a detach request from the first mobile station). In this case, the communication method will delete or change settings related to the first mobile station. More specifically, step 335 is executed to enable the FAP to delete the first uplink LAN service flow and the first downlink LAN service flow according to the first ID code. Then, step 337 is executed to enable the FAP to update the second uplink LAN service flow according to the first ID code. Finally, step 339 is executed to enable the FAP to delete the first ID code.

In addition to the aforesaid steps, the communication method of the example embodiment of the present invention may also execute all the operations and functions set forth in the first embodiment. How the communication method of the present invention executes these operations and functions will be readily appreciated by those of ordinary skill in the art based on the explanation of the first embodiment and, thus, will not be further described herein.

As used in this specification, the terms "first", "second", "third" and "fourth" that refer to the first packet, the second packet, the third packet and the fourth packet are merely used to distinguish the first packet, the second packet, the third packet and the fourth packet from each other. Likewise, the terms "first" and "second" that refer to the first mobile station and the second mobile station are merely used to distinguish the first mobile station and the second mobile station from each other. This also applies to the terms "first" and "second" that refer to the first uplink LAN service flow, the first downlink LAN service flow, the second uplink LAN service flow and the second downlink LAN service flow.

As can be seen from the above descriptions, in addition to establishing WAN service flows for mobile stations within the LAN coverage thereof, the FAP and the communication method of certain embodiments of the present invention further establish LAN service flows for the mobile stations (i.e., the first uplink LAN service flow, the first downlink LAN service flow, the second uplink LAN service flow and the second downlink LAN service flow described above). Thereby, when a mobile station intends to transmit data to other mobile stations located within the same LAN, the LAN service flows will be used by the FAP and the mobile station. On the other hand, when a mobile station intends to transmit data to other devices outside the LAN, the WAN service flows will be used by the FAP and the mobile station. By separating the WAN service flows from the LAN service flows, data to be transmitted within the LAN will not be transmitted firstly to the femto gateway and then back to the target mobile station. Consequently, data transmissions within the LAN are not restricted by the bandwidth of the WAN and fully enjoy the bandwidth of the LAN. Furthermore, as all data transmissions of the LAN occur within the LAN and occupies no bandwidth of WAN. Therefore, problems confronted by the conventional FAP are addressed by the FAP and the communication methods of the present invention.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A femto access point (FAP) for use in a network system, a first mobile station and a second mobile station being wirelessly connected to the FAP, the FAP comprising:
   a storage unit;
   a sniffer unit, being configured to sniff a first packet of the first mobile station when the first mobile station acquires a wireless area network (WAN) service via a WAN service flow and sniff a second packet of the second mobile station when the second mobile station acquires the WAN service;
   a process unit, being configured to retrieve a first identity (ID) code of the first mobile station from the first packet, store the first ID code into the storage unit, establish a first uplink local area network (LAN) service flow and a first downlink LAN service flow of the first mobile station according to the first ID code, retrieve a second ID code of the second mobile station from the second packet, change the first uplink LAN service flow according to the second ID code; and
   a transceiving unit, being configured to transmit a setting information of the changed first uplink LAN service flow to the first mobile station to inform the first mobile station that the second mobile station is within a LAN coverage defined by the FAP.

2. The FAP as claimed in claim 1, wherein the processing unit is further configured to store the second ID code into the storage unit, and establish a second uplink LAN service flow and a second downlink LAN service flow of the second mobile station according to the second ID code.

3. The FAP as claimed in claim 2, wherein the transceiving unit is further configured to receive a third packet transmitted via the second uplink LAN service flow by the second mobile station,
   the process unit is further configured to determine that the third packet carries the first ID code, and the transceiving unit is further configured to transmit the third packet to the first mobile station via the first downlink LAN service flow.

4. The FAP as claimed in claim 2, wherein the transceiving unit is further configured to receive a third packet transmitted via the first uplink LAN service flow by the first mobile station,
   the process unit is further configured to determine that the third packet carries the second ID code, and the transceiving unit is further configured to transmit the third packet to the second mobile station via the second downlink LAN service flow.

5. The FAP as claimed in claim 2, wherein the process unit is further configured to determine that the first mobile station is disconnected from the FAP, and the process unit is further configured to delete the first uplink LAN service flow and the first downlink LAN service flow according to the first ID code, update the second uplink LAN service flow according to the first ID code, and delete the first ID code.

6. The FAP as claimed in claim 2, wherein the network system complies with the Worldwide Interoperability for Microwave Access (WiMAX) standard, the process unit is configured to establish the first uplink LAN service flow and the first downlink LAN service flow through a Dynamic Service Addition (DSA) process of the WiMAX standard, the process unit is configured to establish the second uplink LAN service flow and the second downlink LAN service flow through the DSA process, and the process unit is configured to change the first uplink LAN service flow through a Dynamic Service Change (DSC) process of the WiMAX standard.

7. The FAP as claimed in claim 2, wherein the first mobile station and the second mobile station are individually connected to a Dynamic Host Configuration Protocol (DHCP) server via the FAP, the first packet and the second packet are transmitted by the DHCP server to the first mobile station and the second mobile station respectively, the first ID code is an IP address assigned by the DHCP server to the first mobile station, and the second ID code is an IP address assigned by the DHCP server to the second mobile station.

8. The FAP as claimed in claim 7, wherein first packet is a DHCP ACK signal.

9. The FAP as claimed in claim 1, wherein the network system is one of a third generation (3G) mobile communication system, a fourth generation (4G) mobile communication system, and a WiMAX wireless communication system.

10. The FAP as claimed in claim 1, wherein the first ID code is a MAC address.

11. A communication method of an FAP in a network system, a first mobile station and a second mobile station being wirelessly connected to the FAP, the communication method comprising the steps of:
(a) enabling the FAP to sniff a first packet of the first mobile station when the first mobile station acquires a WAN service via a WAN service flow;
(b) enabling the FAP to retrieve a first ID code of the first mobile station from the first packet;
(c) enabling the FAP to store the first ID code;
(d) enabling the FAP to establish a first uplink LAN service flow and a first downlink LAN service flow of the first mobile station according to the first ID code
(e) enabling the FAP to sniff a second packet of the second mobile station when the second mobile station acquires the WAN service;
(f) enabling the FAP to retrieve a second ID code of the second mobile station from the second packet;
(g) enabling the FAP to change the first uplink LAN service flow according to the second ID code; and
(h) enabling the FAP to transmit a setting information of the changed first uplink LAN service flow to the first mobile station to inform the first mobile station that the second mobile station is within a LAN coverage defined by the FAP.

12. The communication method as claimed in claim 11, further comprising the steps of:
(i) enabling the FAP to store the second ID code;
(ii) enabling the FAP to establish a second uplink LAN service flow and a second downlink LAN service flow of the second mobile station according to the second ID code.

13. The communication method as claimed in claim 12, further comprising the steps of:
(k) enabling the FAP to receive a third packet transmitted via the second uplink LAN service flow by the second mobile station;
(l) enabling the FAP to determine that the third packet carries the first ID code; and
(m) enabling the FAP to transmit the third packet to the first mobile station via the first downlink LAN service flow.

14. The communication method as claimed in claim 12, further comprising the steps of:
(k) enabling the FAP to receive a third packet transmitted via the first uplink LAN service flow by the first mobile station;
(l) enabling the FAP to determine that the third packet carries the second ID code; and
(m) enabling the FAP to transmit the third packet to the second mobile station via the second downlink LAN service flow.

15. The communication method as claimed in claim 12, further comprising the steps of:
(k) enabling the FAP to determine that the first mobile station is disconnected from the FAP;
(l) enabling the FAP to delete the first uplink LAN service flow and the first downlink LAN service flow according to the first ID code;
(m) enabling the FAP to update the second uplink LAN service flow according to the first ID code; and
(n) enabling the FAP to delete the first ID code.

16. The communication method as claimed in claim 12, wherein the network system complies with the WiMAX standard, the step (d) is to enable the FAP to establish the first uplink LAN service flow and the first downlink LAN service flow through a DSA process of the WiMAX standard, the step (i) is to enable the FAP to establish the second uplink LAN service flow and the second downlink LAN service flow through the DSA process, and the step (g) is to enable the FAP to change the first uplink LAN service flow through a DSC process of the WiMAX standard.

17. The communication method as claimed in claim 12, wherein the first mobile station and the second mobile station are individually connected to a DHCP server via the FAP, the first packet and the second packet are transmitted by the DHCP server to the first mobile station and the second mobile station respectively, and the first ID code is an IP address assigned by the DHCP server to the first mobile station, and the second ID code is an IP address assigned by the DHCP server to the second mobile station.

18. The communication method as claimed in claim 17, wherein first packet is a DHCP ACK signal.

19. The communication method as claimed in claim 11, wherein the network system is one of a 3G mobile communication system, a 4G mobile communication system, and a WiMAX wireless communication system.

20. The communication method as claimed in claim 11, wherein the first ID code is a MAC address.

* * * * *